(12) United States Patent
Marinescu et al.

(10) Patent No.: US 7,640,583 B1
(45) Date of Patent: Dec. 29, 2009

(54) METHOD AND SYSTEM FOR PROTECTING ANTI-MALWARE PROGRAMS

(75) Inventors: Adrian M. Marinescu, Sammamish, WA (US); Matthew I. Braverman, Redmond, WA (US); Marc E. Seinfeld, Mid Levels (HK)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 11/097,984

(22) Filed: Apr. 1, 2005

(51) Int. Cl.
 G06F 11/30 (2006.01)
 G06F 11/00 (2006.01)
(52) U.S. Cl. .............. 726/22; 713/187; 713/188; 713/189; 726/24
(58) Field of Classification Search .......... 380/1; 713/24, 165, 167, 187–190, 193, 194; 726/22–24
See application file for complete search history.

(56) References Cited

U.S. PATENT DOCUMENTS

| | | | |
|---|---|---|---|
| 5,440,723 A * | 8/1995 | Arnold et al. ............... 714/2 |
| 5,892,899 A * | 4/1999 | Aucsmith et al. ............ 726/27 |
| 6,006,328 A * | 12/1999 | Drake ........................ 726/23 |
| 6,594,761 B1 * | 7/2003 | Chow et al. ................. 713/190 |
| 7,263,722 B1 * | 8/2007 | Luo et al. ................... 726/26 |
| 2003/0120938 A1 * | 6/2003 | Mullor ....................... 713/190 |
| 2005/0050396 A1 * | 3/2005 | Thomborson et al. ......... 714/38 |
| 2007/0234070 A1 * | 10/2007 | Horning et al. ............. 713/190 |

FOREIGN PATENT DOCUMENTS

WO   WO 00/72112 A2 * 11/2000

OTHER PUBLICATIONS

Perriot et al. "Virus Analysis: Striking Similarities," May 2002, Virus Bulletin Ltd, pp. 4-6.*
"RetroGuard: Documentation," Dec. 2, 2003, RetroGuard Systems, pp. 1-17.*
Ludwig, Mark. "The Giant Black Book of Computer Viruses," 1995, American Eagle Publications Inc, pp. 15-16.*
IBM technical disclosure Bulletin, "Anti-virus Virus," Jan. 2000.*
Hyppönen, Mikko, "Retroviruses—how viruses fight back," Jun. 1994, F-Secure Ltd.*
"Symantec Security Response: Cpw.1527," Feb. 13, 2007, Symantec.*
"Virus.Win32.CTX.10853," Jun. 16, 2000, VirusList.com, Kaspersky Lab.*
Virus Bulletin, Dec. 1998, ISSN 0956-9979, pp. 1-5.*
Mouth of Sauron, "Futher virus strategies: VX Heaveans," indexed www.archive.org on Jan. 6, 2003.*
Ször, Péter, "The New 32-bit Medusa," Dec. 2000, Virus Bulletin, pp. 8-10.*

* cited by examiner

*Primary Examiner*—Beemnet W Dada
*Assistant Examiner*—Darren Schwartz
(74) *Attorney, Agent, or Firm*—Workman Nydegger

(57) ABSTRACT

In general, embodiments of the present invention provide protection for anti-malware software programs (also referred to herein as anti-malware) that is in addition to the protection that currently exists. In particular, instead of only protecting anti-malware programs from malware attacks by attempting to detect the malware software programs (also referred to herein as malware) before they can accomplish their malicious task, embodiments of the present invention obfuscate, or hide, the anti-malware and/or files associated with the anti-malware. Obfuscating files makes it difficult for malware to locate the information needed to accomplish its malware tasks. Additionally, because obfuscation makes file location difficult, malware that attempts to overcome this protection technique will likely include or use a detection engine.

20 Claims, 4 Drawing Sheets

METHOD AND SYSTEM FOR PROTECTING ANTI-MALWARE PROGRAMS

FIELD OF THE INVENTION

In general, the present invention relates to computer protection and, in particular, to a system and method for protecting anti-malware programs from malware attacks.

BACKGROUND OF THE INVENTION

Anti-malware software programs, also known as anti-malware programs, are designed to protect computers from malware software ("malware"), such as a virus or Trojan horse. Generally described, malware is any type of program designed to perform malicious tasks that damage or disrupt a computer system. Malware often includes information about anti-malware programs, such as .exe or .dll file names, signatures of anti-malware files, the size of anti-malware files, and/or the location of those files. This information may be used by a malware program to locate and destroy the anti-malware process in a computer's memory, remove registry keys that allow the anti-malware to startup properly, and delete the anti-malware or portions of anti-malware from the computer's hard disk.

To protect anti-malware programs from being destroyed by malware, the anti-malware must detect the malware before it has the opportunity to perform its malicious tasks. Typically, such detection is accomplished using anti-malware scanners and detection engines to analyze files as they are added to or created on a computer. Scanners determine the signature of a new file and compare that signature with signatures stored in a malware library that is maintained by the anti-malware program. Detection engines quarantine files and analyze the behavior of the file to determine if it is likely to be malware. If a scanner or detection engine determines that a file is malware, the anti-malware program prohibits the file from remaining on the computer and does not allow the file to execute. In order for anti-malware scanners and detection engines to be able to detect all of the different forms of malware, the malware library must be frequently updated with information about new malware.

However, malware is being developed and released in large numbers (generally a malware program is released in small numbers then replicates) and many of those creations are complex and difficult to detect, even with information about the malware. Due to the number and complexity of malware being created and released, it is becoming difficult to keep anti-malware programs up-to-date with information that is needed to detect the newly created malware. If such information is not maintained and as malware becomes more complex, the likelihood increases that a malware program intended to destroy anti-malware programs will accomplish its task.

Thus, the existing techniques for protecting anti-malware from malware attacks are becoming insufficient. Accordingly, there is a need for a system and method that provide additional protection for anti-malware programs and associated files. Additionally, such a method and system should make malware that is designed to overcome the additional protection easier to detect, thereby providing further protection.

SUMMARY OF THE INVENTION

In general, embodiments of the present invention provide protection for anti-malware software programs (also referred to herein as anti-malware) that are in addition to the protection that currently exists. In particular, instead of only protecting anti-malware programs from malicious attacks by attempting to detect the malware software programs (also referred to herein as malware) before they can accomplish their malicious task, embodiments of the present invention obfuscate, or hide, the anti-malware and/or files associated with the anti-malware. Obfuscating files makes it difficult for malware to locate the information needed to accomplish its malicious tasks. Additionally, because obfuscation makes file location difficult, malware that attempts to overcome this protection technique will likely include and/or use a detection engine. Detection engines are generally large in size and produce an identifiable signature. Thus, malware that includes a detection engine will be readily identifiable using currently existing detection techniques, such as a signature scanner. Additionally, malware that attempts to use an existing detection engine is may be identified as a result of its use of the detection engine.

In accordance with an aspect of the present invention, a method for protecting information from an attack by a malware program is provided. The method identifies an item of information that is to be protected from an attack by a malware program and obfuscates the identified information by altering the identification of the information. The obfuscation may include changing the identification of the item (e.g., the file name), altering the signature of the item, and/or changing the size of the item. For example, the signature and/or size of the item may be changed by obtaining the binary file for the item and inserting filler code into the binary file. Additionally, functions of the binary file may be reorganized, which may alter the signature of the item when the binary file is recreated.

In accordance with another aspect of the present invention, a computer system having a computer readable storage medium that includes hardware storage media including a computer-executable program therein for performing the method of protecting files of an anti-malware program from being attacked by a malware program is provided. The computer program protects files of an anti-malware program by identifying the file to be protected, randomizing the file name of the identified file to create a new file name for the anti-malware file, and performing polymorphism on the anti-malware file to alter the size and signature of the anti-malware file.

In accordance with another aspect of the present invention, a computer system having a computer-readable medium including a computer-executable program therein for enabling the identification of a malware program is provided. The program enables identification of a malware program by obfuscating files associated with an anti-malware program wherein the files are obfuscated such that detection of the files by a malware program requires that the malware program include a detection engine. Once files have been obfuscated, the program searches for and locates an unknown file utilizing a detection engine and, in response to locating an unknown file utilizing the detection engine, identifies that unknown file as a malware program. As described in more detail below, if the file includes a detection engine it is easily identified because detection engines are large and produce an identifiable signature that can be detected by an anti-malware program. Alternatively, as discussed below, if the malware program attempts to use detection engine that is already present on the computer (e.g., the anti-malware's detection engine) the use of that engine may also be detected by an anti-malware program.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Anti-malware programs generally have static file names for each of their files and associated files. Likewise, those files are typically static in size and stored at common locations. As mentioned above, one technique for attacking and destroying anti-malware is by knowing information about the anti-malware, such as the file name, location and/or size, and using that information to locate anti-malware files, registry keys, etc., and delete the located files from the computer system.

While currently-existing malware detection techniques, such as scanning and detection engines, are good at detecting known malware, the potential exists for an unidentified malware program to invade a computer and destroy the anti-malware program before it is detected. Thus, additional protection techniques are desirable for protecting anti-malware from malware attacks. In general, such techniques may include techniques utilized by malware programs in an effort to hide themselves. For example, as described in more detail below, such techniques may include randomizing file names that are used by an anti-malware program, randomizing the file name of the anti-malware program itself, changing signature and/or size of the files (polymorphism) used by the anti-malware programs, relocating the files used by the anti-malware programs, and/or a combination of randomizing file names, changing file sizes, and relocating files.

File name randomization may utilize any type of randomization algorithm to create new file names and may be performed at any time. For example, randomization may be performed at installation of the anti-malware program itself, daily, or upon user request (user, server, etc.) in response to detection of a malware program, or at any other time. Additionally, polymorphism and/or file relocation may be performed at any time.

Polymorphism, as described in more detail below, includes inserting random code into the binary code of the file, thereby changing the signature and size of the compiled file. Additionally, polymorphism may be accomplished by reorganizing the functions included within a binary file. Such reorganization may also alter the signature of the file when recreated. Still further, polymorphism may include performing both the insertion of random code into the binary file and reorganizing the functions of that file.

Figure 1:
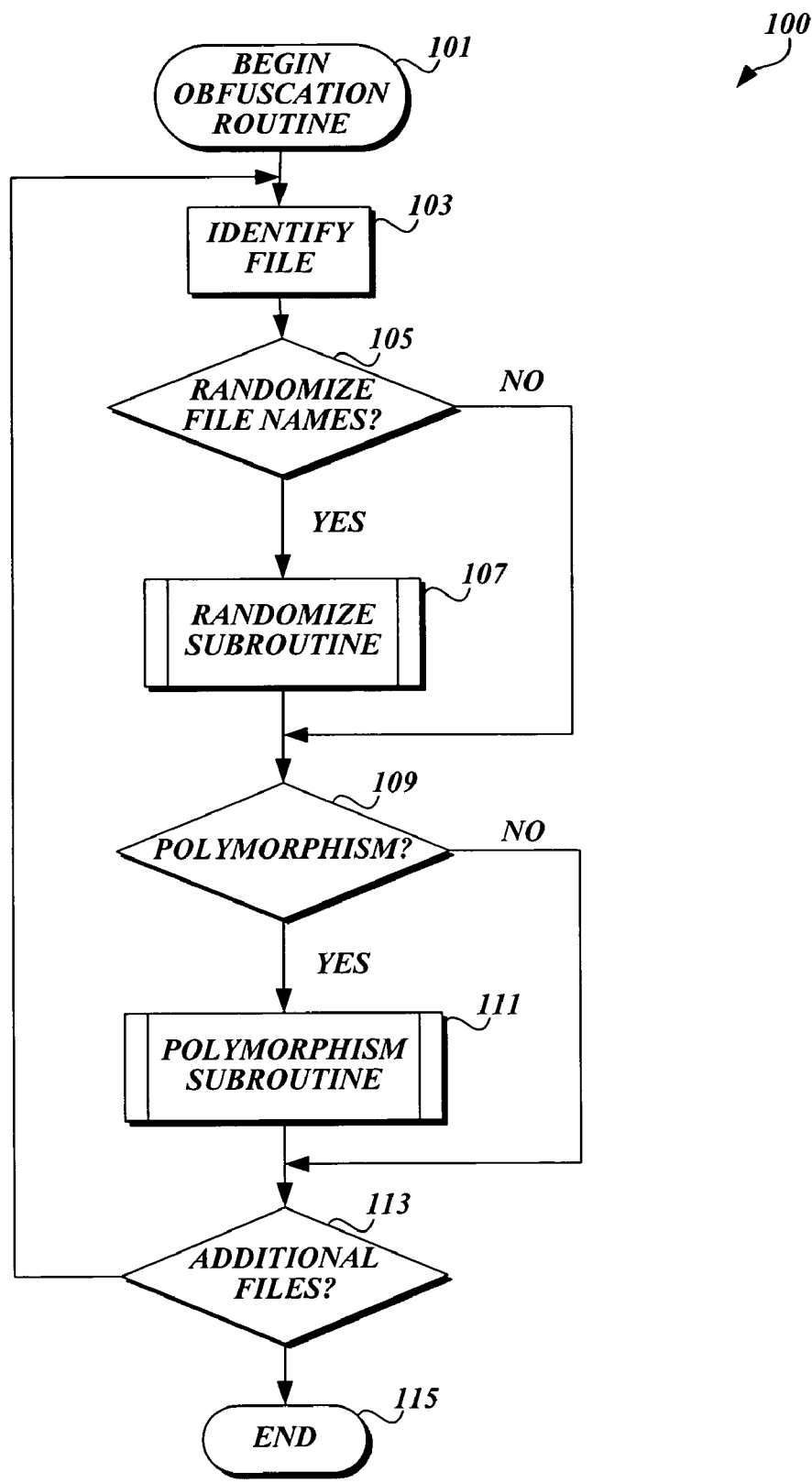
FIG. 1 is a block diagram of an obfuscation routine used to protect anti-malware programs and associated files, in accordance with an embodiment of the present invention.

FIG. 1 is a block diagram of an obfuscation routine used to protect anti-malware programs and associated files, in accordance with an embodiment of the present invention. The obfuscation routine 100 begins at block 101 and at block 103 identifies a file associated with the anti-malware program that is to be protected. Upon identification of a file, at decision block 105, the routine 100 determines if the identified file's name is to be randomized. If it is determined that the identified file's name is to be randomized, the randomization subroutine is performed, as illustrated by subroutine block 107 and described in detail with respect to FIG. 2. However, if it is determined at decision block 105 that the file name is not to be randomized, or upon completion of the randomization subroutine 107, at decision block 109, it is determined if polymorphism is to be performed for the identified file. If it is determined at decision block 109 that polymorphism is to be performed, the polymorphism subroutine is performed, as illustrated by block 111 and described in more detail with respect to FIG. 3.

Upon completion of the polymorphism subroutine 111 or if it is determined at decision block 109 that polymorphism is not to be performed on the identified file, at decision block 113, it is determined if there are additional files that are to be protected. If it is determined at decision block 113 that there are additional files to be protected, the routine 100 returns to block 103 and continues. However, if it is determined at decision block 113 that there are no additional files to be protected, the routine completes, as illustrated by block 115.

Figure 2:
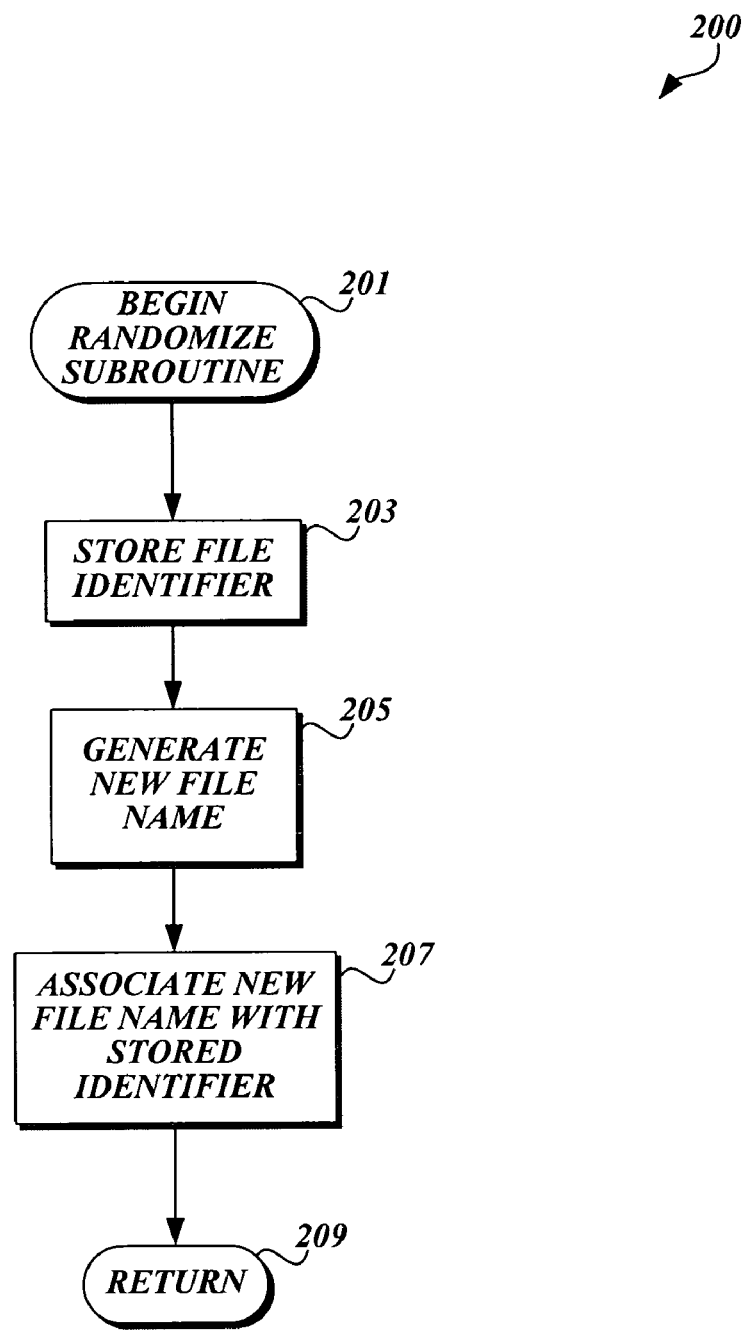
FIG. 2 is a block diagram of a randomization subroutine for randomizing a file name of an identified file, in accordance with an embodiment of the present invention.

FIG. 2 is a block diagram of a randomization subroutine for randomizing a file name of an identified file in accordance with an embodiment of the present invention. The randomization subroutine 200 begins at block 201, and at block 203, a file identifier for the file identified at block 105 (FIG. 1) is stored by the anti-malware program. The file identifier is stored by the anti-malware program so that it can locate the file after the name has been randomized. The file identifier may be, for example, a hash value for the file. In an alternative embodiment, the file identifier may be the current file name and when the file name is randomized, the mapping to the file may be updated within the anti-malware program to identify the new file name.

At block 205, a new file name is generated for the identified file and that file is associated with the new file name. At block 207, the newly generated file name is associated with the stored identifier, thereby allowing the anti-malware program to locate and access the newly named file, as necessary. Even though a mapping between the original file name and the new (randomized) file name is maintained, such information is internal to the anti-malware program and not accessible to potential malware or other programs.

At block 209, the randomization subroutine completes returning control to the obfuscation routine 100. The obfuscation routine 100 and/or the randomization subroutine 200 may be performed at any point in time to alter the names of files that are used and/or associated with anti-malware. For example, the randomization subroutine 200 may be performed upon installation of the anti-malware, at startup of the computer, on a daily interval, or upon request (e.g., user or server request, etc.). The randomization of file names may be accomplished using any type of randomization algorithm to generate file names or based on some predefined randomization scheme.

Additionally, while the randomization subroutine 200 has been described with respect to storing a file identifier and associating the newly created file name with the stored identifier to allow access by the anti-malware program, other techniques for tracking the newly-named file by the anti-malware program may be utilized in accordance with embodiments of the present invention. For example, the randomization subroutine 200 may, as an alternative to storing a file identifier, generate a new file name for the identified file and update the file location information utilized by the anti-malware to identify this new file name, thereby replacing the previously used file name.

Figure 3:
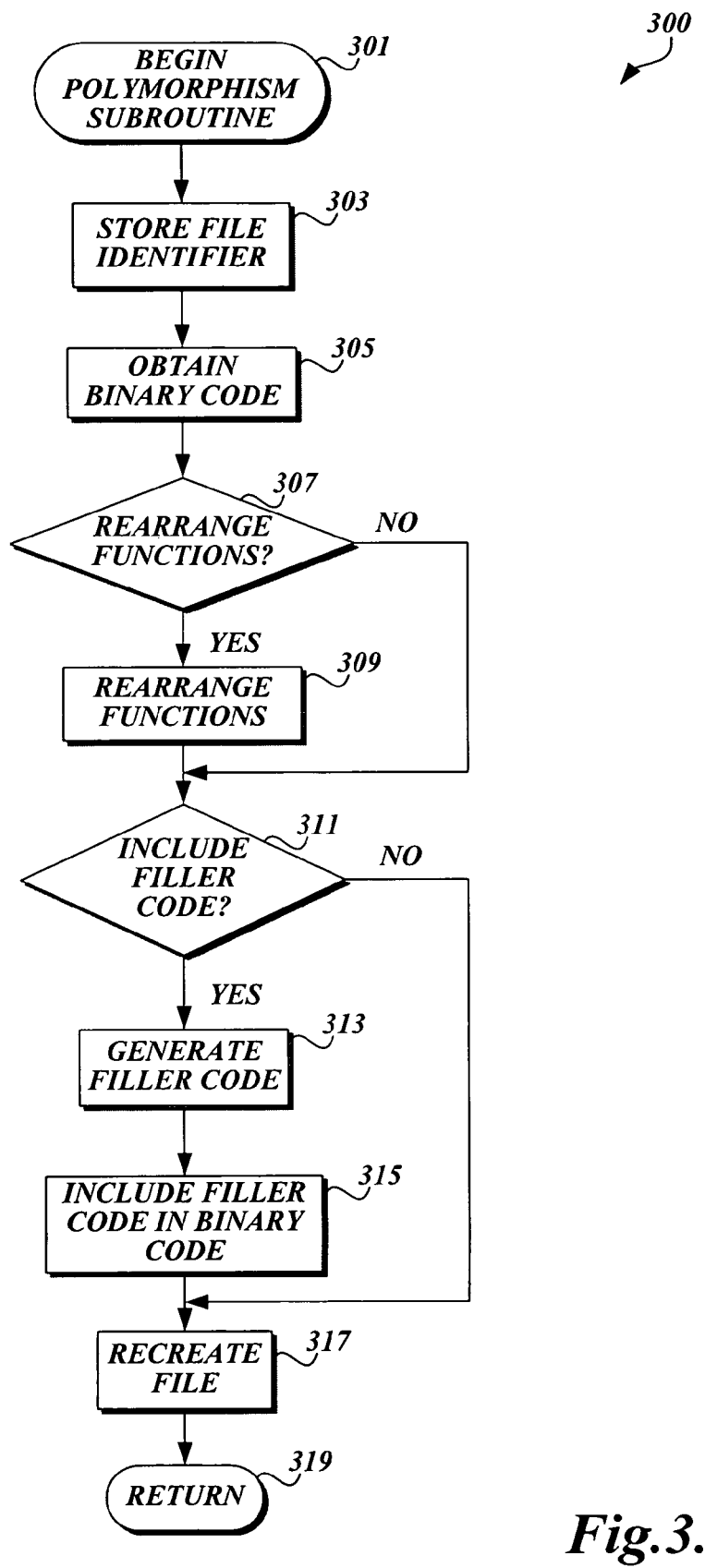
FIG. 3 is a block diagram of a polymorphism subroutine that is used to perform polymorphism on an identified file, in accordance with an embodiment of the present invention.

FIG. 3 is a block diagram of a polymorphism subroutine that is used to perform polymorphism on an identified file, in accordance with an embodiment of the present invention. Similar to the randomization subroutine 200 (FIG. 2), the polymorphism subroutine 300 may be performed at any time, such as at installation of the anti-malware program, at startup of the computer, daily, upon request (e.g., user or server request), etc.

The polymorphism subroutine 300 begins at block 301, and at block 303, a file identifier for the file identified at block 103 (FIG. 1) is stored. At block 305, the binary code for the identified file is obtained and at decision block 307, a determination is made as to whether the functions of that binary code are to be rearranged. Rearranging functions of binary code may, upon compiling the binary code, alter the signature of the file. Thus, if the malware includes a file signature for the identified file, it will not be able to detect the file as its signature has been changed. If it is determined at decision block 307 that the functions of the binary code are to be rearranged, those functions are rearranged in a random order, as illustrated by block 309.

Upon completion of the rearrangement of the functions at block 309, or if it is determined at decision block 307 that the functions are not to be rearranged, at decision block 311 a determination is made as to whether "filler code" is to be included into the binary code. "Filler code," as used herein, is any code that may be included into existing binary code that does not alter the operation of the original binary code. For example, filler code may be a command to write a value to an empty memory location followed by a command to erase that value. Including filler code into a binary code of a file changes the size of the file when compiled and changes the signature of the file itself. Thus, if a malware program includes information about file size and/or file signature that it may use to locate the file, such identification by the malware program will not be accomplished as the file size and file signature have been altered.

If it is determined at decision block 311 that filler code is to be included into the binary code, at block 313 the filler code is generated and/or obtained from a filler code database and at block 315 inserted into the binary code itself. Filler code may be inserted at any point(s) of the binary code. For example, as described in more detail with respect to FIG. 4, the filler code may be included between different functions of the binary code or interspersed into a function of the binary code.

Upon insertion of the filler code into the binary code at block 315, or if it determined at decision block 311 that the filler code is not to be included, at block 317 the file is recreated or compiled using the modified binary code. Upon recreation of the identified file, the polymorphism subroutine 300 completes and returns control to the obfuscation routine 100 (FIG. 1), as illustrated by block 319.

In addition to randomizing the file name and altering the file size and/or signatures using polymorphism, the location of files used by an anti-malware program may also be altered to provide still further protection against malware attacks. For example, if a file used by the anti-malware program is typically stored at C:\ProgramFiles\AntiMalware\, the location of the file may be altered to any other location, such as C:\AntiMalware\. In relocating the files, the anti-malware program is updated to identify the locations of the files so that they can be accessed as necessary.

Figure 4:
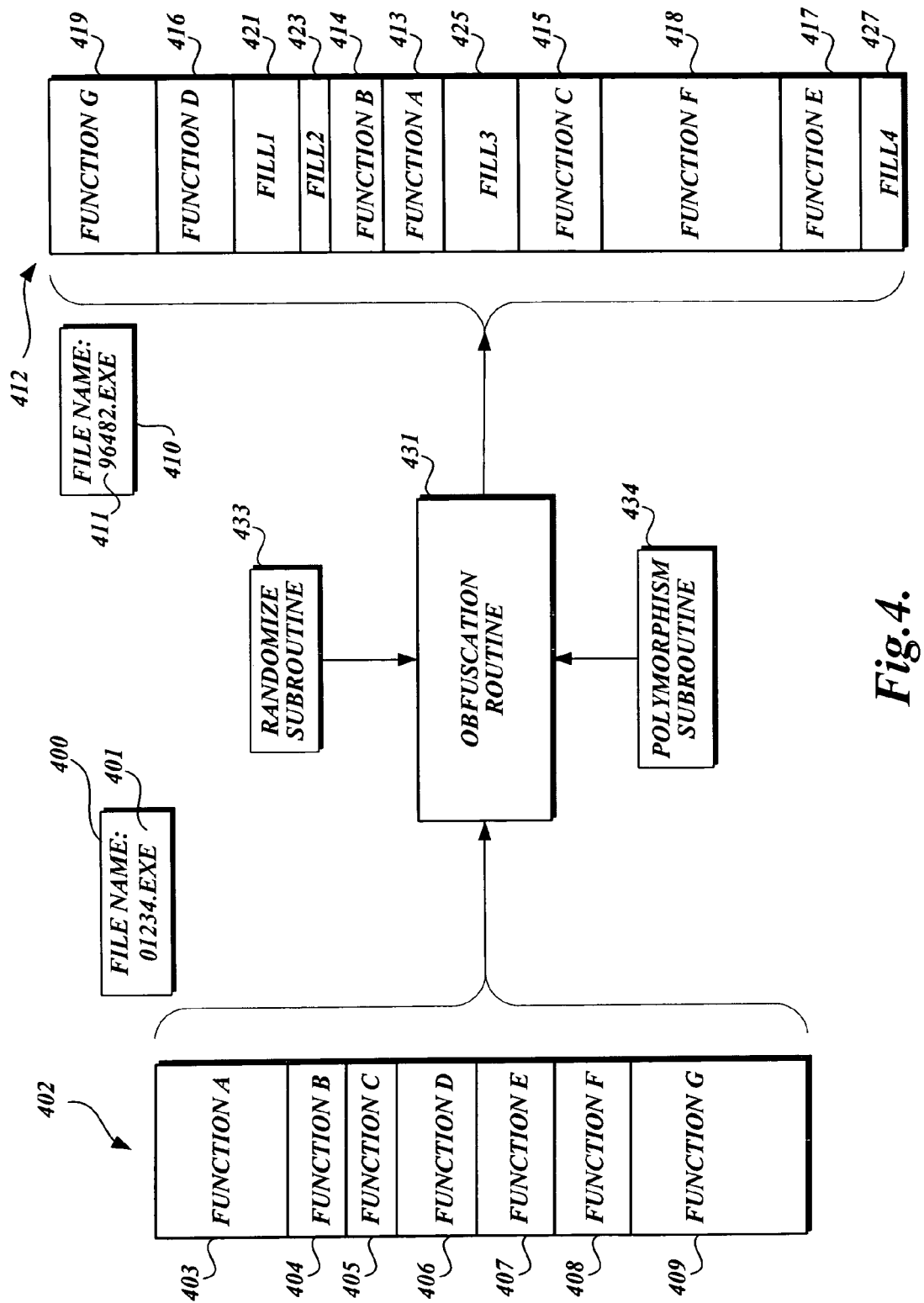
FIG. 4 is a block diagram illustrating the obfuscation that may be performed on a file associated with an anti-malware program for protecting that file against potential attacks by malware, in accordance with an embodiment of the present invention.

FIG. 4 is a block diagram illustrating the obfuscation that may be performed on a file associated with an anti-malware program for protecting that file against potential attacks by malware, in accordance with an embodiment of the present invention. As described above, a file 400 may have a file name, such as 01234.exe 401, and its binary code 402 may include one or more functions, such as Function A 403, Function B 404, Function C 405, Function D 406, Function E 407, Function F 408, and Function G 409. As described above, the file 400 may be protected from attacks by malware by obfuscating the file. For example, the obfuscation routine 431 may be executed on the file 400, thereby creating an obfuscated file 410. As described above, the obfuscation routine 431 may include a randomization subroutine 433 and/or a polymorphism subroutine 434 that is used to obfuscate the file 400 into the file 410 to thereby protect the file from potential malware attacks. Obfuscation provides protection by altering (1) the file name, (2) the file location, (3) the file's signature, and/or (4) the file size. For example, performing the obfuscation routine 431 utilizing both the randomization subroutine 433 and the polymorphism subroutine 434 on the file 400 may result in an obfuscated file, similar to the file 410. The randomization subroutine 433 may alter the file name from 01234.exe 401 to the file name 96482.exe 411. Additionally, the obfuscation routine 431 may move the file to a new location.

As discussed above, some malware is designed to attack anti-malware programs by having knowledge of the file name or file location. Using knowledge of the file name and/or location, the malware may identify the file and delete that file from the computer's memory. By performing the randomization subroutine on a file that may be identified by malware, thereby changing the file name, it will protect that file from detection by the malware program. Relocating the file also may provide further protection.

Additionally, utilizing the polymorphism subroutine 434 provides additional protection for a file, such as file 400. For example, utilization of the polymorphism subroutine 434 by the obfuscation routine 431 may result in a file similar to that illustrated by file 410 and its corresponding binary code 412. For example, the polymorphism subroutine 434 may reorganize the functions 403, 404, 405, 406, 407, 408, 409 of the binary code 402 used to create the file 400 into any random order, thereby potentially changing the signature of the file. Also, filler code may be included into the binary code 402 used to generate the file 400, thereby changing the file size and the file signature. For example, filler code, such as fill1 421, fill2 423, fill3 425, and fill4 427, may be included into the binary code 412 used to create obfuscated file 410 when the binary code 402 for the file 400 is obfuscated by the obfuscation routine 431.

Referring to FIG. 4, completion of the obfuscation routine 431 on file 400 and its corresponding binary code 400 may result in a reorganized file, as illustrated by file 410, wherein, in the binary code 412, Function G 419 appears first and Function D 416 appears second. Additionally, two filler codes, fill1 421 and fill2 423, may be inserted after Function D. Following the fill2 423 code, Function B 414 may be included in the binary code 412, followed by Function A 413. Subsequent to Function A 413, another filler code, fill3 425, may be included, followed by Function C 415. Function F 418 may be included subsequent to Function C 415, followed by Function E 417 and, lastly, by filler code fill4 427. As will be appreciated by one of ordinary skill in the relevant art, the Functions 413, 414, 415, 416, 417, 418, 419 and the filler code 421, 423, 425, 427 may be arranged in any order by the obfuscation routine 431, and the arrangement presented with respect to FIG. 4 is provided for explanation purposes only.

The embodiments described herein for obfuscating files, such as randomization of file names, polymorphism, and/or relocating files, provide protection for anti-malware programs and associated files in addition to the currently existing scanning and detection engine techniques used to identify malware. However, the embodiments described herein provide the additional benefit that, if malware is designed in an effort to overcome these additional protection techniques, such malware will be easily identifiable.

In particular, to overcome the obfuscation techniques described herein, the malware will likely include and/or use a detection engine similar to those currently used by anti-malware programs to detect malware. Inclusion of a detection engine will increase the size of the malware itself and will make the malware more detectable due to the common signature of the detection engine within the malware. For example, inclusion of a detection engine in a malware program that is used to detect files that have had their file names randomized would generate an identifiable signature, thereby making the malware itself easily detectable by the anti-malware programs. Alternatively, if the malware program attempts to use a detection engine that currently exists on the computer (e.g., an existing anti-malware detection engine) the use of that engine will be detectable by the anti-malware programs. Thus, embodiments in the present invention not only provide additional protection against malware programs, they thwart additional efforts to overcome these protection techniques.

While the embodiments of the present invention have been illustrated and described, it will be appreciated that various changes can be made therein without departing from the spirit and scope of the invention.

We claim:

1. A method for protecting information used by an anti-malware program from an attack by a malware program, the method comprising:
    identifying an item of information used by an anti-malware program to be protected from an attack by a malware program;
    obfuscating the identified information by altering the identification of the information, altering the identification of the information comprising each of changing a file name of a first file, changing a file signature of the first file, and changing a file size of the first file; and
    identifying a signature of a detection engine employed by the malware program, the detection engine is employed by the malware program to detect the obfuscated information and the identified signature of the detection engine facilitates detection of the malware program by the anti-malware program, a signature of employment of a detection engine comprising at least one of opening a file associated with the detection engine, writing to a file associated with a detection engine, altering identification of information of a file associated with a detection engine, or changing the value of a variable found in the code for a detection engine;
    wherein changing the file signature of the first file includes:
        obtaining a binary code for the first file, the binary code including a plurality of functions;
        reorganizing the plurality of functions of the binary code;
        modifying the binary code by adding filler code to the binary code, the filler code comprising a first command to write a value to an empty memory location and a second command to erase the value that was written to the memory location; and
        recreating the first file from the modified reorganized binary code.

2. The method of claim 1, wherein changing the file name is performed using a randomization algorithm to generate a new file name for the first file.

3. In a computer system having a computer-readable storage medium that includes hardware storage media including a computer-executable program therein for performing the method of protecting files of an anti-malware program from being attacked by a malware program, the method comprising:
    identifying an anti-malware file;
    randomizing a file name of the anti-malware file to create a new file name for the anti-malware file; and
    performing polymorphism on the anti-malware file to alter the size and signature of the anti-malware file upon at least one of: the installation of the anti-malware program, at the startup of the computer system, daily, or user request;
    wherein performing polymorphism on the anti-malware file to alter the size and signature of the anti-malware file includes:
        obtaining a binary code for the anti-malware file, the binary code including a plurality of functions;
        reorganizing the plurality of functions of the binary code;
        modifying the binary code by adding filler code to the binary code, the filler code comprising a first command to write a value to an empty memory location and a second command to erase the value that was written to the memory location; and
        recreating the anti-malware file from the modified reorganized binary code.

4. The method of claim 3, further comprising:
    moving the anti-malware file from a first directory to a different second directory.

5. The method of claim 3, wherein randomizing the file name includes:
    storing an identification of the anti-malware file;
    generating a new name for the anti-malware file; and
    associating the new name with the stored identification of the anti-malware file to thereby enable the anti-malware program to located the anti-malware file.

6. In a computer system having a computer-readable storage medium that includes hardware storage media including a computer-executable program therein for enabling the identification of a malware program, the method comprising:
    obfuscating a first file associated with an anti-malware program, the first file is obfuscated such that detection of the first file associated with the anti-malware program by a malware program requires that the malware program use a detection engine;
    locating an unknown malware program file that is using a detection engine to detect obfuscated anti-malware; and
    in response to locating the unknown malware program file that is using a detection engine to detect obfuscated anti-malware, identifying the unknown file as a malware program;
    wherein obfuscating the first file includes:
        obtaining a binary code for the first file, the binary code including a plurality of functions;

reorganizing the plurality of functions of the binary code;

modifying the binary code by adding filler code to the binary code, the filler code comprising a first command to write a value to an empty memory location and a second command to erase the value that was written to the memory location; and recreating the first file from the modified reorganized binary code.

7. The method of claim 6, wherein the unknown malware program file includes a detection engine.

8. The method of claim 7, wherein the detection engine has an identifiable signature, and locating an unknown malware program file using a detection engine includes:

locating the unknown malware program file by the identifiable signature of the detection engine.

9. The method of claim 6, further comprising:

removing the malware program from the computer system.

10. The method of claim 1, wherein obfuscating the identified information further comprises employing a process loop to secure a file, process or data, or a combination thereof, of the anti-malware program.

11. The method of claim 1, further comprising identifying as a malware program a computer-implemented process attempting to employ a detection engine to identify a file or process of the anti-malware program, the identification of the computer-implemented process as a malware program occurs because the malware program attempts to employ a detection engine that exists independent of the malware program.

12. The method of claim 3, wherein obfuscating the identified information further comprises employing a process loop to secure a file, process or data, or a combination thereof, of the anti-malware program.

13. The method of claim 1, further comprising moving the recreated first file from a first directory to a different second directory.

14. The method of claim 1, wherein obfuscating the identified information is performed according to a predetermined daily schedule.

15. The method of claim 1, wherein the anti-malware program is installed on a computer; and wherein obfuscating the identified information is performed in response to the computer starting up.

16. The method of claim 3, wherein performing polymorphism on the anti-malware file to alter the size and signature of the anti-malware file is performed according to a predetermined daily schedule.

17. The method of claim 3, wherein the anti-malware file is installed on a computer; and wherein performing polymorphism on the anti-malware file to alter the size and signature of the anti-malware file is performed in response to the computer starting up.

18. The method of claim 6, further comprising moving the recreated first file from a first directory to a different second directory.

19. The method of claim 6, wherein obfuscating the first file is performed according to a predetermined daily schedule.

20. The method of claim 6, wherein the anti-malware program is installed on a computer; and wherein obfuscating the first file is performed in response to the computer starting up.

\* \* \* \* \*